United States Patent [19]

Burke et al.

[11] Patent Number: 4,564,737

[45] Date of Patent: Jan. 14, 1986

[54] AUTOMATIC LAYOUT MACHINE FOR TIRE TREAD PATTERNS

[75] Inventors: Victor B. Burke; Charles R. Burkholder, both of Akron, Ohio

[73] Assignee: F.M.P. Enterprise, Inc., Akron, Ohio

[21] Appl. No.: 512,363

[22] Filed: Jul. 11, 1983

[51] Int. Cl.$^4$ .............................................. B23K 26/08
[52] U.S. Cl. ...................... 219/121 LH; 219/121 LP; 219/121 LW; 219/121 LX
[58] Field of Search .................. 219/121 LH, 121 LJ, 219/121 LP, 121 LW, 121 LX

[56] References Cited

U.S. PATENT DOCUMENTS 4,469,930  9/1984  Takahashi .................. 219/121 LN

FOREIGN PATENT DOCUMENTS

| 1146635 | 5/1983 | Canada | 219/121 LJ |
| 1157103 | 11/1983 | Canada | 219/121 LJ |
| 12952 | 7/1980 | European Pat. Off. | 219/121 LW |
| 148610 | 6/1981 | German Democratic Rep. | 219/121 LH |
| 57-126646 | 8/1982 | Japan | 219/121 LH |
| 57-126647 | 8/1982 | Japan | 219/121 LJ |
| WO83/01696 | 5/1983 | PCT Int'l Appl. | 219/121 LH |
| 2040074 | 8/1980 | United Kingdom | 219/121 LX |

OTHER PUBLICATIONS

Weiner, "Product Marking with ND: YAG & CO$_2$ Lasers", SPIE, vol. 86, Industrial Applications of High Power Laser Tech., 1976, pp. 23-29.
Heidary et al., "Microprocessor-Controlled Laser Scanning System for Annealing of Semiconductors", Optics & Laser Tech., Oct., 1981, vol. 13, No. 5, pp. 265-269.
Hansen, "Neodymium-yttrium-Aluminum Laser Marking System", SPIE, vol. 247 (1980) pp. 18-23.

*Primary Examiner*—C. L. Albritton
*Assistant Examiner*—Alfred S. Keve
*Attorney, Agent, or Firm*—Oldham, Oldham & Weber Co.

[57] ABSTRACT

A machine for automatically marking a tire tread pattern on a model block or blank prototype tire having a cylindrical-curved surface of a progressively decreasing radius. A plurality of model blocks or a blank tire is mounted on a turntable which rotates at a predetermined constant speed. A laser beam emanating from a laser in a predetermined series of pulses following a raster approach is directed by optic assemblies against the slowly rotating curved surface to form a series of dots which define the tire tread pattern. The laser is pulsed by a computer which stores the tire tread pattern and interprets the pulses from a rotary encoder. One of the optic assemblies moves vertically to have the laser beam scan the curved surface and another optic assembly moves horizontally to keep the laser beam in focus by following the crown or surface curvature. A raster is traced by the laser beam on the curved surface with a raster line denoting one cycle or convolution of the helix. The tread pattern stored in the memory of the computer is correlated with angular position of the rotating curved surface. Along each raster line the transition is made between the laser writing spots or skipping spots to form the tread pattern.

17 Claims, 11 Drawing Figures

AUTOMATIC LAYOUT MACHINE FOR TIRE TREAD PATTERNS

TECHNICAL FIELD

The invention relates to the layout of tire tread patterns on curved surfaces and in particularly the writing of a tire tread pattern on a complete set of plaster model blocks or on a prototype tire by use of a laser beam controlled by a microcomputer or similar control equipment.

BACKGROUND ART

Tires are molded in a clamshell-like arrangement under pressure and at elevated temperatures. One shell contains a male mold and the other a female, with each mold being formed of cast aluminum. Each mold has a ring shape corresponding to the shape that would result if a tire was cut along the centerline of the tread. These aluminum molds are cast from plaster blocks which are curved and tapered and fitted together to form a closed circular ring.

These blocks are called waste cores and are made from plaster which is so soft it can be crushed by hand and dissolved in water. After the casting of the aluminum mold, the waste core is flushed out leaving a clean aluminum mold which has a tire tread pattern molded therein. The aluminum molds and waste cores are made at a foundry. The waste cores which are called shells, are made from plaster blocks which have an outer rubber surface. Rubber surfaces are used because plaster casting in a plaster mold will not separate.

The pattern in the shell is opposite to that of the actual tire, that is, where the tire has rubber the shell will have air and conversely where the tire has air the shell will have material. The supplying of these rubber patterns or shells to the foundry for casting of the aluminum tire molds is a difficult and time consuming operation since it requires the accurate layout of the tire tread pattern on the curved surfaces of the plaster blocks from which the rubber coated shells are derived.

Presently, this is done patiently and very carefully by hand and eye coordination using a height gauge, measuring calipers, and a scribe. The tolerance is generally within the range of ±0.003 inches. Fatigue and dull instruments cause misplaced lines, lines which are too thick, and lines of varying thickness. Undetected layout errors propagate throughout the production process and ultimately appear on the manufactured tire. Tire tread designs are becoming more intricate with an increased use of curved rather than straight line segments. Patterns with mostly curved lines are difficult or impossible to lay out on a plaster block or on a rubber pattern shell. Recourse has been made to placing a drawing of the tire tread over the model block and using a pin to prick the pattern into the block.

A set of these carved blocks is the basis of a manufactured tire. The carved blocks are created from drawings supplied to a pattern shop of an independent company or from a tread layout group of the tire manufacturer. The shape of a model block is like a stone in an arch. Over the surface with the largest radius, a portion of the total tire pattern is laid out as discussed above. When the layout is completed, the pattern then is carved with delicate hand tools. Several years of the developing skills in laying out the pattern is necessary for a carver to perform effectively. When hundreds of thousands of tires are made, an excess depth in the carving process of thousands of an inch is a sensitive matter because of the accumulative cost.

To aid carvers, the surface layer is made of soft plaster for use of carving and usually is colored green to reduce eye fatigue. Underneath the soft plaster layer is a very hard plaster which is colored blue and which is difficult to carve. Tread depth is determined not by carving but by the thickness of the outer soft layer. Finally the treadware indicator level is colored yellow in the plaster mold.

A figure of revolution called a "sweep" is a multilayered ring of polystyrene, hard plaster, and soft plaster. The ring may span 330°. The ring surface which corresponds to the surface of the tire to be manufactured, is smooth and is the blank sheet on which the pattern is carved. When partitioned by radial cuts into various sized segments, the model blocks for carving are obtained.

A template made of sheet metal is clamped to sturdy support bars which are clamped to a radial arm which is free to rotate about an axis. The rotating template determines the cross section of the sweep. Initially, the template has the shape for the bottom layer of the tread. Plaster which sets hard, like concrete is colored blue and is swept. After cutting a portion of the template away, the yellow tread wear indicator layer then is swept. Again, more of the template is cut away to sweep the soft green layer in which the tire tread is carved. Radial and vertical shrinkage allowance is built into the sweep to compensate for shrinkage in the cast aluminum mold.

The surface of the sweep is smooth and convex. From the top of the sweep to the bottom (from the shoulder to the centerline of a tire) the curve of the surface is called the crown. For an aluminum mold the corresponding surface is concave, and the curve is now called a cavity rather than a crown.

The model block is partitioned into segments called "pitches". The thickness of the partition is the length of the pitch. Pitches come in different lengths, but frequently they all carry exactly the same information about the tire pattern. In other words, the pattern on one pitch differs from the pattern on another pitch at most by stretching or shrinking the length or thickness of the partition. This is usually true for every pitch, and the pitch is one of the fundamental elements of a tire design. Typically, there are six pitches on a model block, nine blocks to a ring for a total of fifty-four pitches. The ordering of pitch lengths on a model block is called the pitch sequence. Similarly, the ordering of model blocks to make an aluminum mold is referred to as a block sequence. Tires with irregular ratios for pitch length roll quieter, that is, the acoustic resonance is suppressed to eliminate tire "sing".

In some designs, each pitch is quartered and the pieces are offset lengthwise. In appearance one pitch looks like a staircase while the aggregate forms four bands, each ring shaped around the tire. Other designs may have either one, two or three bands although one band is the most common. Thus, the tire pattern of a tire is defined by specifying the information in a pitch, the band width and offsets, the pitch sequence, the block sequence and the crown shapes. A block, rather than a pitch, may be the basic repetitive element in some tire tread designs. Also, a "free form" design can be accommodated.

The number of blocks that must be laid out and carved with the tire tread depends upon the number of different blocks needed to make both halves of the aluminum mold.

For example, if "A" denotes one model block and "B" denotes another block with different pitch lengths, then the sequence "AABABBAAB" describes an aluminum mold cast from nine blocks, only two of which are different. Similarly, the second aluminum mold could have a block sequence "CCDCDDCCD". This pattern would require a layout and carving of four blocks. Four recast models and/or four rubber patterns would be carved and sent to a foundry for subsequent forming of the aluminum mold.

The simplest structure to a tire tread pattern would require only carved block with pitches of equal length. At most, two blocks would be carved, the male and female halves. Through duplication, the tire would be the least expensive to manufacture. However, it would also be the noisiest due to the acoustic resonance produced due to the regular pattern. Thus, most tires are not made of such a simple design. Instead, a typical design requires two or three different model blocks to compose an aluminum mold each with either five or seven differently sized pitches.

Occasionally a tire pattern may require as many as thirteen carved blocks with up to nine different pitched lengths per block. The trend today is toward more complex designs for tire treads requiring a larger number of carved blocks and having a greater number of pitch lengths.

Thus, the need has existed for a system which will enable a tire tread pattern to be written on a complete set of plaster model blocks or on a prototype tire in a minimum time as possible and with a high degree of accuracy to eliminate the heretofore manual layout of the tire tread pattern.

DISCLOSURE OF INVENTION

Objectives of the invention include providing an improved automatic layout machine for writing with a pulsed laser beam a tire tread pattern on a large curved cylindrical surface of decreasing radius such as a complete set of plaster model blocks or a prototype tire; and in which the laser beam is emitted from a laser in a predetermined series of pulses following a raster approach with the firing of the laser being controlled by a rotary encoder and computer containing the tire tread pattern. Another objective is to provide such a layout machine in which the model block or prototype tire is mounted on a horizontal turntable rotatable about a vertical axis; in which the laser beam is directed by optical assemblies against the curved surface being inscribed; and in which one of the optical assemblies is movable vertically whereby the laser beam will scan the curved surface, with another of the optical assembly being movable horizontally to keep the laser beam in focus when following the crown or surface curvature while tracing a finely pitched tapered helix on the curved surface.

Still another objective of the invention is to provide such a layout machine in which a raster line denotes one cycle or convolution of the helix and in which a transition is made between the laser writing spots or skipping spots to form the tire pattern on the curved surface upon completion of the entire tapered helix followed by the laser beam. Another objective is to provide such a layout machine in which the turntable on which the curved surface to be inscribed is mounted, is rotated at a uniform speed with the vertical scan of the laser beam along the entire surface also being constant throughout the entire writing process, and with the horizontal movement or beam focus being updated once each revolution to follow the shape of the crown of the curved surface which is stored in the memory of the computer.

Another objective of the invention is to provide such a layout machine in which the pulsed laser beam etches a series of dots or depressions in the curved surface during the tracing of the tapered helix throughout the entire curved surface, which dots are closely spaced to form both curved and straight lines which define the tire tread pattern eliminating the heretofore manual marking of the tire tread pattern on the curved surface by use of instruments or a template placed over the surface; and in which a coloring dye can be wiped over the curved surface after the laser beam marks the tread pattern thereon to more clearly define the pattern for the subsequent carving of the tread.

A further objective is to provide such an automatic layout machine which reduces error in the layout of the tire tread pattern caused by fatigue to the layout operator and dull instruments resulting in lines which are too thick or of varying thickness, and which eliminates layout errors which heretofore propagate throughout the production process.

These objectives and advantages are obtained by the improved layout machine for marking a tire tread pattern on an object such as a model block or blank tire, the general nature of which may be stated as including turntable means for rotatably mounting an object to be marked; laser means for producing a laser pulse; optic means for directing the laser pulse from the laser means against the object to mark said object; means for positioning the optic means in relationship to the rotation of the turntable means to control the contact point of the laser pulse on the object; and means for firing the laser means at predetermined position intervals of the rotating object to mark the object at predetermined points as the object is rotated by the turntable means, to define a tire tread pattern on the object upon a predetermined number of revolutions of said turntable means.

BRIEF DESCRIPTION OF DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
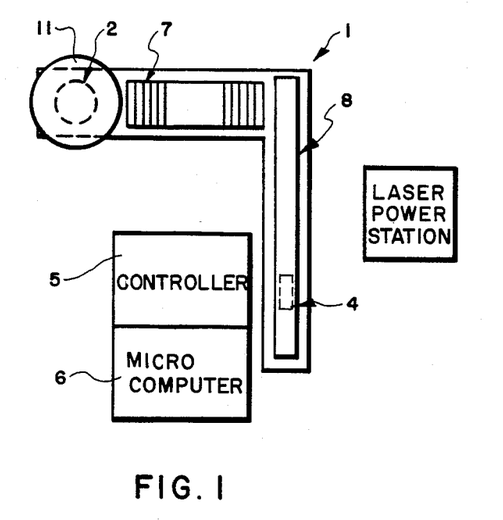
FIG. 1 is a top plan diagrammatic block diagram of the improved automatic layout machine and associated controls.
Figure 2:
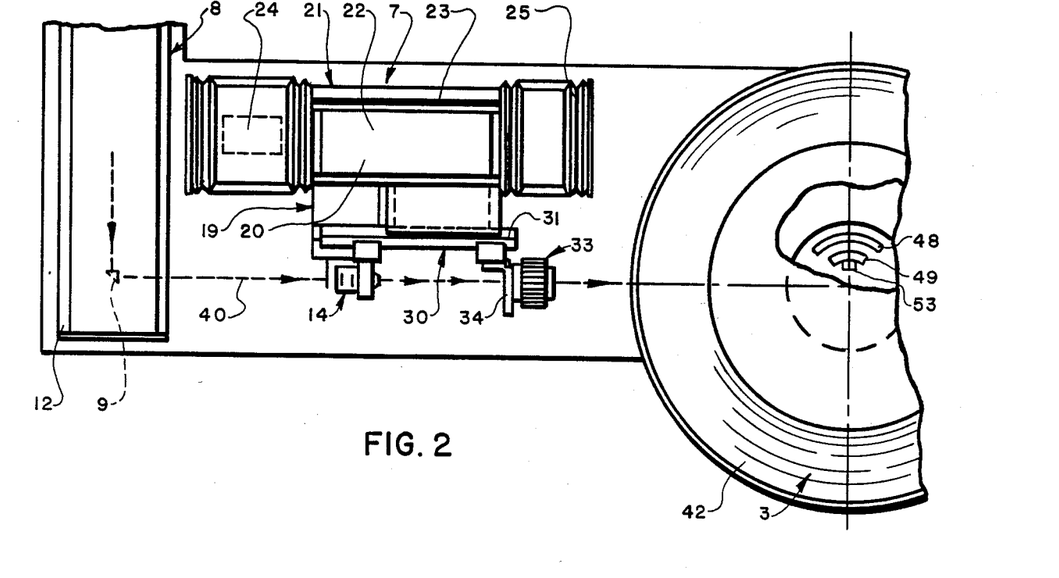
FIG. 2 is an enlarged fragmentary top plan diagrammatic view of the layout machine of FIG. 1.
Figure 3:
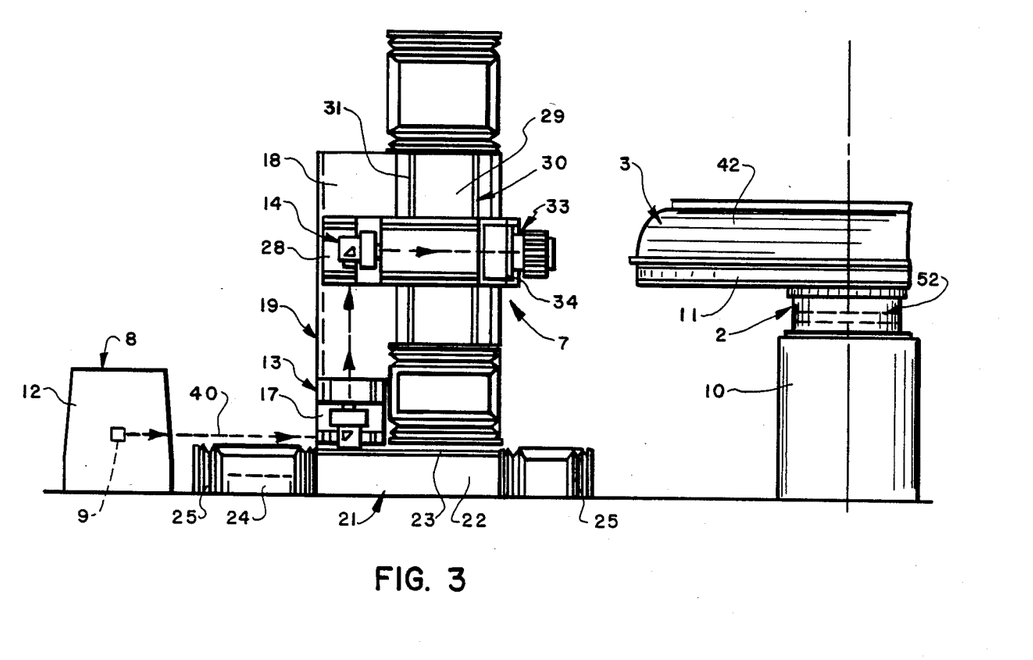
FIG. 3 is a fragmentary elevational view of the layout machine of FIG. 2.
Figure 4:
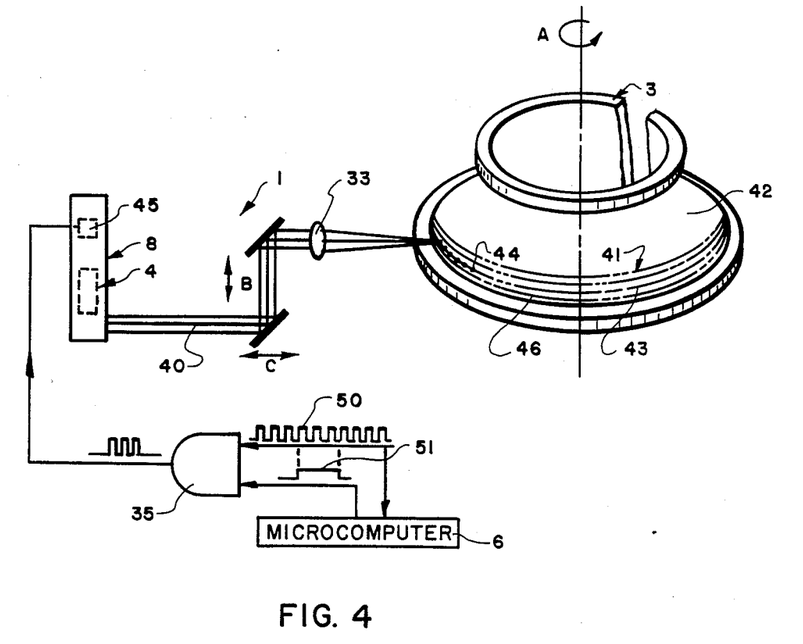
FIG. 4 is a diagrammatic perspective view of the improved layout machine shown writing a tire tread pattern on a model block.
Figure 6:
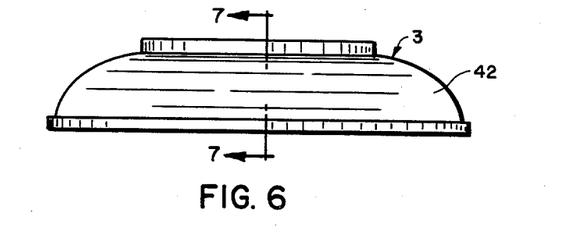
FIG. 6 is an elevational view of the model block sweep of FIG. 5.
Figure 7:
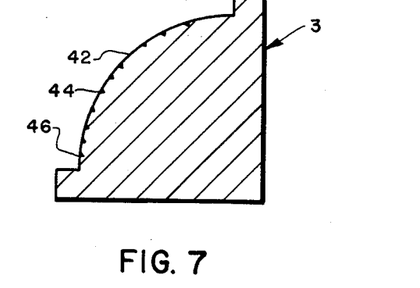
FIG. 7 is an enlarged sectional view taken on line 7—7, FIG. 6.
Figure 8:
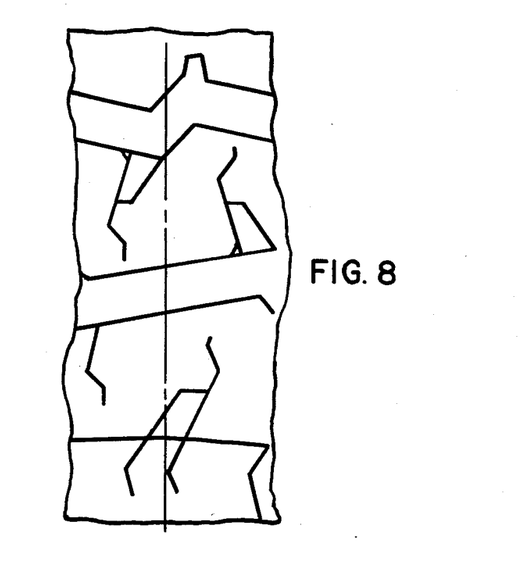
FIG. 8 is an enlarged elevational view showing a portion of a tire tread pattern on a model block.

The improved automatic layout machine is indicated generally at 1, and is shown diagrammatically particularly in FIGS. 1 and 4. Machine 1 includes as main components a turntable 2 for rotatably mounting a sweep 3 (FIG. 6), a laser 4, a positioning controller 5, a computer 6 and a laser beam control and adjustment mechanism 7. Referring to FIGS. 2 and 3, turntable 2, mounted on a base 10, includes an optical rotary encoder 52, a motor and other power components (not shown) for rotating a mounting platform 11 at a predetermined constant speed.

A variety of mechanisms may be attached to mounting platform 11 for holding sweep 3. One particular type may consist of a plurality of rings which are bolted on the top of the turntable having an outer diameter complementary to the internal diameter of sweep 3. With this type of mounting arrangement, no external brackets or attachments means are engageable with the outer portion of sweep 3 so as to interfere with the laser beam. Turntable 2 may be a rotary positioning table of the type distributed by Anorad Corporation of Hauppauge, N.Y. under its trademark Anoround, in which rotary encoder 52 is a component thereof.

Laser 4 may be of the type produced by Holobeam Laser, Inc. a subsidiary of Control Laser Corporation of Orlando, Fla., identified as a Series 520 Laser. The laser operates in the low-order multimode having a focal length of approximately 3 inches with a writing speed of 10 kHz and provides a high peak power required to vaporize material necessary in cutting and drilling operations.

An enclosed optical assembly, indicated generally at 8, includes laser 4 and optics for directing the pulsed laser beam toward sweep 3. Assembly 8 consists of beam-delivery optics 9 contained in an outer housing 12 (FIGS. 2 and 3) to protect the laser head and optic surfaces from the operational environment. Optical assembly 8 includes a 90° mirror and beam-focusing assembly for changing the path of the laser beam 90° to enable more efficient space utilization. Optical assembly 8 may be of the type identified as Model 4174 Enclosure/Optics Assembly also distributed by Control Laser Corporation of Orlando, Fla.

Laser beam control and adjustment mechanism 7 includes a pair of 90° prism mount optical assemblies indicated generally at 13 and 14, for changing the laser beam 90° as shown diagrammatically in FIG. 3. Assemblies 13 and 14 preferably are identical and may be of the type distributed by Control Laser Corporation as Model 2008. Optical assembly 13 includes an optical rail 17 which is firmly mounted on a vertical plate 18 of an L-shaped bracket 19 having a base leg 20 which is mounted on a horizontal positioning table indicated generally at 21 (FIGS. 2 and 3). Table 21 includes a horizontally movable carriage 22 mounted on a pair of spaced fixed slides 23 by crossed rollers. Carriage 22 is moved by a motor 24 located within one of the end seals 25.

Optical assembly 14 is fixed on an optical rail 28 which is similar to optical rail 17 of optical assembly 13 but of a longer length. Rail 28 is movably mounted on a carriage 29 of a vertical positioning table indicated generally at 30 (FIG. 3), whose slides 31 are fixed on vertical plate 18 of bracket 19.

Positioning tables 21 and 30 are similar and may be of the type distributed by the Anorad Corporation as Model 7S under its trademark Anoride.

A focusing lens assembly indicated generally at 33, is mounted on a bracket 34 which is attached to optical rail 28 of optical assembly 14. the rotation of turntable 2, linear movement of carriages 22 and 29 together with optical assemblies 13 and 14, is accomplished through programmable positioning controller 5 (FIGS. 1 and 4). One type of controller 5 suitable for automatic layout machine 1 is distributed by Anorad Corporation under its designation Anomatic II. Microcomputer 6 is connected with a Q-switch 45 of laser 4 and with controller 5 to provide the desired program and operation to controller 5 and firing of laser 4.

In accordance with one of the features of the invention, a raster method is used for writing a tire tread pattern on a model block or prototype tire similar to the way an electron gun writes pictures on a TV screen. The raster approach required a three-axis arrangement; rotation of sweep 3 (arrow A, FIG. 4) vertical movement of optical assembly 14 (arrow B) enabling the laser beam to scan the sweep, and horizontal movement of optical assembly 13 (arrow C) to follow the crown of the curved surface being marked, keeping the laser beam in focus. Two motions, the rotation of sweep 3 and the vertical scan or movement of positioning table 30, preferably are constant throughout the entire tire tread writing process. Both motions are programmable, preferably having default values of 30 RPM and 0.00125"/sec., respectively. The third axis or horizontal movement of table 21 may be updated once each revolution to follow the shape of the crown which is stored in the memory of the computer 6. The motion of table 21 is a slow monotonic advance toward sweep 3.

The principal components of the system as set forth above are sweep 3 mounted on turntable 2 which includes rotary encoder 52 which through controller 5 preferably generates 40,000 counts per revolution, Q-switched Nd:YAG laser 4 which fires 0.005" diameter spots on sweep 3, computer 6 which stores a tire tread pattern, counts encoder pulses 50 and enables laser writing 51, and an AND gate 35. The pattern specifies intervals during which the laser either writes or skips. With sweep 3 rotating uniformly and with the horizontally directed laser beam which is indicated at 40 (FIG. 4) slowly scanning the vertical, a finely-pitched tapered helix, a portion of which is shown in a greatly exaggerated condition and indicated gererally at 41. FIG. 4, is traced out on curved surface 42 of sweep 3. A raster line 43 denotes one cycle or convolution of tapered helix 41, that is, a line corresponding to one revolution of sweep 3. The tire centerline is indicated at 46. Over surface 42 of sweep 3 in the preferred embodiment, there are about 1,600 raster lines uniformly spaced on 0.0025" centers.

Figure 9:
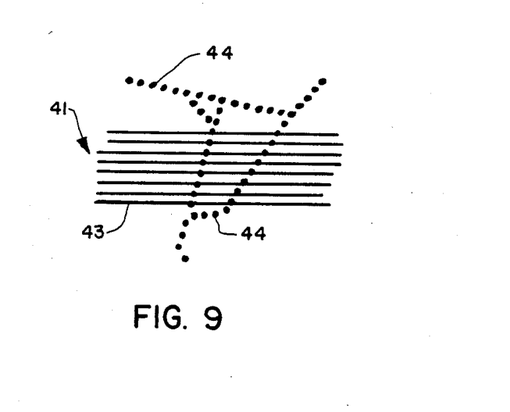
FIG. 9 is a greatly enlarged elevational view of a portion of the tire tread pattern of FIG. 8 showing the spots formed thereon by the laser beam.

At some point along each raster line 43, a transition is made from writing spots 44 (FIGS. 4 and 9) to skipping spots, or conversely. The distance between successive transitions is called a transition interval length. It is important that these lengths be expressed in terms of counts derived from rotary encoder 52 contained in turntable 2. In this manner the tread pattern stored in computer 6 is correlated with angular position. Encoder 52 is of a usual construction and preferably includes a rotating encoder 48, a glass scale 49 and a photoelectric light source and detector 53, shown diagrammatically in FIG. 2.

Each pulse sent to the Q-switch 45 of laser 4 causes the laser to write one spot 44. There is a limit to the rate at which the particular laser preferred for lay-out machine 1, can be pulsed, namely 10 kHz. Beyond this rate the laser drops pulses. To write the pattern at the correct locations, timed pulses are not used to control the Q-switch. Rather, position derived pulses are used, those from the rotary optical encoder 52.

There are various ways this might be done. For illustration purposes the use of a counter is described. Other ways may be employed, such as a comparator, a register or by generating a pulse sequence similar to the video signal for a TV.

The transition interval counts are stored in computer 6 which is provided with an algorithm to read them in proper sequence. The details of this algorithm are described below. Positive counts signify WRITE is true, negative counts mean WRITE is false. The rotary encoder pulses are applied to a counter and to an AND gate 35.

The interval count is supplied to the counter from computer 6 and if the count is positive, then WRITE is true. For each pulse from rotary encoder 52 the laser writes one spot and the counter is decremented by one count. If the count is negative, then WRITE is false. For each pulse from the rotary encoder the laser skips one spot, and the counter is incremented by one count. If there is an interrupt, the program will proceed to the interrupt handler routine. If the line number is greater than the line limit, the program will stop. If the counter is zero, the next interval count is supplied to the counter and the sequence is repeated.

At 30 RPM, sweep 3 rotates one-half revolution per second. With 40,000 counts per revolution, the rotary encoder pulse rate is 20 kHz. The period corresponding to 20 kHz is 50 microseconds and is the time that the microcomputer has to set up the next count. Writing an isolated spot 44 is the worst case test for computer 6 and a common feature of every pattern. For example, each oblique pattern line contains an isolated point on successive raster lines. Within the allotted 50 microseconds memory unit 6 must be able to write the spot and be ready to process the next transition interval count, without any slippage. As a check, the sum of the transition interval counts processed each revolution should be 40,000.

Because computer 6 will be busy only during transitions, it spends most of its time doing nothing. Suppose it takes 40 microseconds to process each transition interval count (TIC). With 40 microsec/TIC×8 TIC/pitch×8 pitch/block×3 block×1,600 lines/pattern =12.3 sec/pattern. The rest of the 57 minutes it takes to write a pattern, computer 6 is idle. It is really active only 100×12.3/(57×60)=0.36% of the time, for a typical job with three blocks to be carved.

Figure 10:
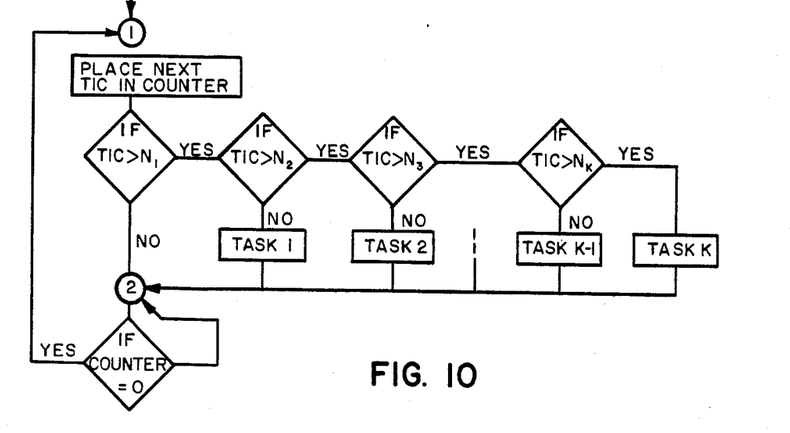
FIG. 10 is a schematic view of the real-time calculation circuitry portion of the control system.

With a TIC of 450 it would take 22.5 milliseconds to complete the write instructions. During this time computer 6 may perform another task, if it can get back in time to handle the next transition interval count without slippage. Unit 6 has approximately 50 microseconds to process a TIC and decide if there is not enough time to service another routine. Other tasks may include the real-time scaling of transition interval counts for other pitches and adjusting the horizontal axis to maintain the focus of the laser beam. FIG. 10 shows schematically a real-time calculation circuitry which may be used for improved layout machine 1.

Just under 30,000 bytes are required to store the pattern for one pitch. A typical tire measures four inches from the centerline to the sidewall. A raster line each 0.0025" results with 1,600 lines. On the average there are eight transition interval lengths per line: 8×1,600=12,800 values. Two bytes are required per value. A one dimensional array is needed to keep track of the actual number of transition lengths in each line: 25,600+1,600=27,200 bytes.

Values for pitches of different lengths may be scaled from the reference pitch data. Scaling may be done either in real-time or before writing begins. If scaling occurs in real-time, then memory storage is minimum (about 32kB). Otherwise, prescaled values may be stored either on a hard or floppy disk or in read/write/-memory (RAM). In either case, no calculations would have to be performed while writing.

Suppose values for all pitches were on disk and were organized in the proper sequence to write raster lines. Then RAM could function as a buffer or, more precisely, as a queue (first in first out). Data would have to move from disk to RAM faster than the average writing rate of 200 TIC's/sec. (1 rev/2 sec×50 pitches/rev×8 TIC's/pitch=200 TIC's/sec.) Microprocessor speed and RAM requirements are modest with this scheme. For a typical job, floppy disk storage of 614,400 bytes would be needed (3 blocks/job×8 pitches/-block×1,600 lines×8 TIC's/pitch=307,200 TIC's/-job×2 bytes/TIC=614,400 bytes).

Alternatively, suppose values were stored only for pitches of different lengths. Consider a typical case with five distinct pitch lengths. 129,600 values would be stored (12,800 TIC's/pitch×5 pitches×2 bytes/-TIC+1,600=129,600). These values may be stored in RAM for fastest operation.

As discussed above, an algorithm is provided to read the transition interval counts in proper sequence which are stored in computer 6. Therefore, it is necessary to write TIC's in a sequence which composes complete raster lines, successively, from the following given listed data:

(a) A table in RAM with TIC's for each pitch of different length.

(b) A list of the numbers of TIC's in each raster line segment of a pitch.

(c) Block sequence for the sweep (not for the aluminum mold).

(d) Pitch sequence for each block.

(e) Bandwidths and offsets.

(f) Skip regions of the sweep.

Figure 11:
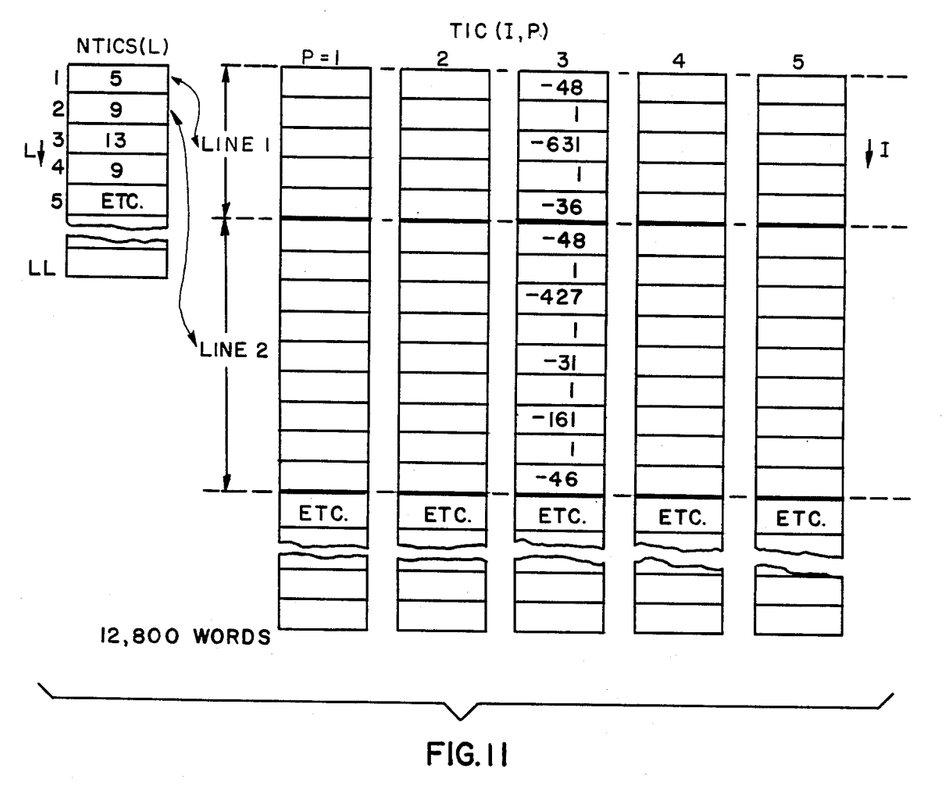
FIG. 11 is a schematic representation of the computer memory data illustrating five pitches of different length in developing the line composition algorithm.

The RAM data is represented schematically in FIG. 11 for five pitches of different lengths. L is the raster or line number. LL is the line limit which preferably is 1,600 bytes. NTICS(L) is the number of TIC's in line L which is the same for every pitch. TIC (I,P) is a table of TIC's. P is an index denoting pitch length. P=1 corresponds to the shortest length pitch, P=5 to the longest. I indicates the Ith TIC of a pitch. Line boundaries for I are given by variables line & start and line & end. In a given line, every pitch has the same number of TIC's. For example, as shown in FIG. 11, every pitch has five TIC's in line 1, nine in line 2, thirteen in line 3, etc. Pitch patterns are the same except for length. For a given pitch, each line has the same number of TIC's. For example, the third pitch, p=3, has 717 TIC's in each line (48+1+631+1+36=717; 48+1+427+1+31+1+161+1+46=717). This has to be since each raster line segment of a pitch has the same angular length regardless of where the line is on the crown. Negative TIC's are skipped by the laser, positive TIC's are written. In this example, only isolated spots are written. In general, the number of consecutively written spots may range from one to the full length of a block.

Figure 5:
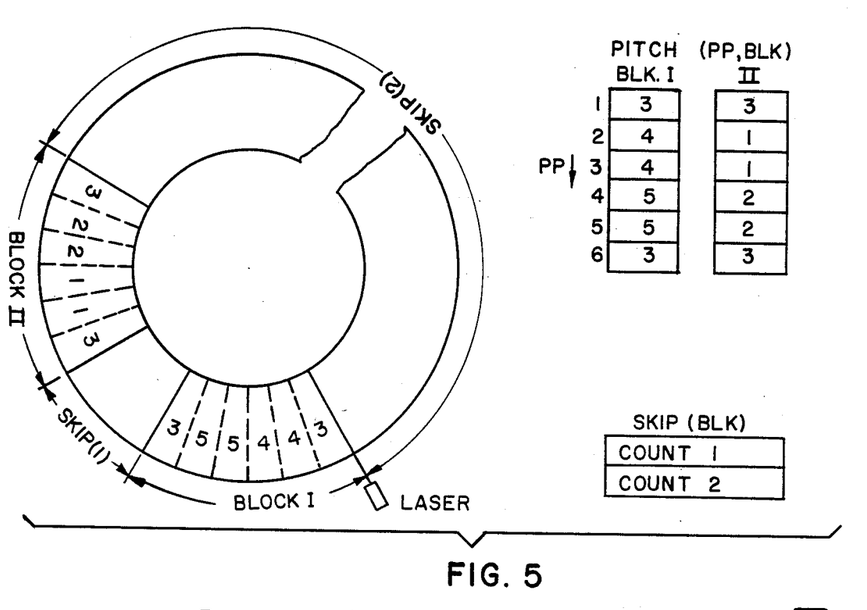
FIG. 5 is a top plan view of a sweep containing two model blocks, with the pitch sequence of each model block of the sweep being shown in tabular form.

Referring to FIG. 5, the pitch sequence of the first or block I is 3, 4, 4, 5, 5, 3 and of the second or block II is 3, 1, 1, 2, 2, 3. Each block contains three distinct pitch lengths: (3, 4, 5) for block I; (1, 2, 3) for block II. One pitch length is common to both blocks (3). Skip (1) may be a small count, but it should be large enough to allow for the kerf of a band saw.

The composition of a raster line is as follows:
LINE$START=1
FOR LINE=1 TO LINE$LIMIT: For a line
LINE$SEND=LINE$START=NTICS(LINE)-1;
FOR BLK=1 to BLK$LIMIT; and a block
FOR PP=1 TO PP$LIMIT;
P=PITCH (PP,BLK); select a pitch
FOR I=LINE$START TO LINE$END; select which TIC
WRITE TIC(I,P); Write TIC's for
NEXT I; that line
NEXT PP; next pitch of same line
WRITE SKIP (BLK); space between blocks
NEXT BLK; same line of next block
LINE$START=LINE$END=1, start of next line.
NEXT LINE Trace through the algorithm to verify that the first raster line of the sweep is composed from the first five TIC's of pitches 3, 4, 4, 5, 5, 3, in that order, then SKIP (1), then the first five TIC's of pitches 3, 1, 1, 2, 2, 3, in that order, and finally SKIP (2). The second line has the same organization as the first except that the nine TIC's (six through fourteen) of each pitch are written. Each line has 40,000 counts. TIC's are written until the approximately 1,600 raster lines have been completed which constitute the tire tread pattern.

Prototype tires would have a similar algorithm but one including a list for the block sequence. Also bands are not included in the above example. Bands are characterized by widths and offsets. With band widths expressed in numbers of raster lines, and offsets in terms of TIC's, a table could specify values for index variables BAND$START and BAND$LIMIT and associated offsets. Line composition algorithms for prototype tires and for bands can be determined if a RAM storage method is selected.

Nearly all tire producing companies have a data base for the design of tire tread patterns. While drafting has been automated, the model process, resulting with an aluminum mold for the manufacture of tires, has not. Therefore, a goal of improved layout machine 1 is to extend the usefulness of existing data bases by automating the layout of model blocks and prototype tires. However, hand carving of the model blocks and prototype tires will continue.

Two groups of programs are important for successful implementation of the invention. Application programs and conversion programs.

The goal of a conversion program is a transition interval length representation of one pitch. Values preferably are stored on a system compatible floppy disk. Input to the program would be the existing data base representation of a tread pattern. Since each tire producing company may structure their data base uniquely, customized conversion programs may be necessary. One idea for writing the conversion program is to superpose a raster line on the centerline of one pitch. Record the lengths between intersections of the pattern with the raster. These would be the transition interval lengths. Also, record the number of transition interval lengths along the raster line. Displace the raster by 0.0025" and repeat the process. This would continue until data for all raster lines (approx. 1,600) has been obtained.

Generally three application programs will be required. The first is the transformation from transition interval lengths to transition interval counts (TIL's to TIC's). An algorithm to minimize the adverse consequences of quantization truncation error also may be derived. Input to the program would be the data on floppy disk, received from the tire producing company.

The second application program is line composing, that is, the sequencing of transition interval counts to be written along each raster line on a sweep which may be organized from a knowledge of the TIC's in each line of the reference pitch, the block sequence on the sweep, the pitch length sequence for each block, and the band widths and offsets.

The third is a program in which the operator is given an opportunity to enter values for certain parameters, such as RPM (default value=30), scan feed (default value=0.00125"/sec., corrected for shrinkage), etc.

Accordingly, the automatic layout machine is simplified, provides an effective, safe, inexpensive, and efficient device which achieves all the enumerated objectives, provides for eliminating difficulties encountered with prior layout devices and methods, solves problems and obtains new results in the art.

The above description is of the preferred embodiment and may be modified in various ways without affecting the concept of the invention. For example, the raster need not be a finely-pitched helix but can be a series of concentric circles in which the laser beam is adjusted vertically a predetermined distance with respect to the sweep after each revolution. Likewise, the surface being marked may be convexley or concavely curved and need not be cylindrical with a progressively changing radius as described above. The surface may even be flat with either the surface or laser beam being moved, or a combination of both, to provide the raster pattern of the laser beam path on the surface. Also, the various distances, spacings, transition interval lengths per line, etc., may have various values than those specified above.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the automatic layout machine for tire tread patterns is constructed and used, the characteristics of the new machine, and the advantageous, new and useful results obtained; the new and useful structures, devices, elements, arrangements, parts, and combinations, are set forth in the appended claims.

What is claimed is:

1. An automatic layout machine for marking a tire tread pattern on an object such as a model block or blank tire, said machine including:
(a) turntable means for rotatably mounting an object to be marked;
(b) laser means for producing a laser pulse;
(c) optic means for directing the laser pulse from the laser means against the object to mark said object;
(d) means for positioning the optic means in relationship to the rotation of the turntable means to control the contact point of the laser pulse on the object; and
(e) means for firing the laser means in a raster scan at predetermined position intervals of the rotating object to mark the object at predetermined points as the object is rotated by the turntable means, to define a tire tread pattern on the object upon a predetermined number of revolution of said turntable means; and
in which the fire means includes rotary encoder means for generating a predetermined number of counts per revolution of the turntable means, certain of said counts causing the laser means to produce the laser pulse; and computer means containing the tire tread pattern communicating with the rotary encoder to specify intervals during which the laser pulse is produced in response to said certain counts from the rotary encoder means to mark the object; and
in which the counts of the rotary encoder means are applied to a gate; in which a signal is applied to said gate from the computer means, said signal being derived in relationship to the tire tread pattern contained in said computer means; and in which an output signal from said gate fires the laser means.

2. The layout machine defined in claim 1 in which the gate is an AND gate.

3. The layout machine defined in claim 1 in which the rotary encoder is mounted on the turntable means.

4. The layout machine defined in claim 1 in which the rotary encoder means generates 40,000 counts per revolution of the turntable means.

5. The layout machine defined in claim 1 in which the object being marked has a cylindrical curved surface of a progressively decreasing radius on which the tire tread pattern is marked.

6. The layout machine defined in claim 1 in which the turntable means rotatably mounts the object being marked in a horizontal plane about a vertical axis; and in which the optic means directs the laser pulse horizontally against the object being marked.

7. The layout machine defined in claim 1 in which the turntable means is rotated at a predetermined constant speed.

8. The layout machine defined in claim 1 in which the optic means includes a pair of 90° prisms and a focusing lens; in which both of said prisms and focusing lens are movable in unison in a horizontal direction to maintain the focus of the laser beam on the object being marked; and in which the focusing lens and one of the prisms is movable vertically to have the path of the laser beam scan the object being marked.

9. The layout machine defined in claim 8 in which the positioning means includes a horizontally movable positioning table and a vertically movable positioning table operatively mounted on said horizontal table; in which one of the prisms and focusing lens are mounted on the vertical positioning table with the other one of the prisms being mounted on the horizontal positioning table; and in which the vertical positioning table is movably mounted on the horizontal positioning table.

10. The layout machine defined in claim 9 in which the movement of the vertical positioning table is at a constant predetermined speed throughout the marking of the tire tread pattern on the object.

11. The layout machine defined in claim 9 in which the movement of the horizontal positioning table is updated after a predetermined number of revolutions of the turntable means.

12. The layout machine defined in claim 1 in which the object being marked has a cylindrical curved surface of progressively decreasing radius; in which the turntable means is rotated at a uniform speed and the optic means is controlled by the positioning means whereby the laser pulses follow a finely-pitched tapered helical path on the curved surface of the object being marked.

13. The layout machine defined in claim 12 in which the positioning means, optic means, laser means and firing means provides a raster approach for marking a tire tread pattern on the curved surface.

14. The layout machine defined in claim 13 in which one cycle of the tapered helix traced by the laser beam denotes a single raster line.

15. The layout machine defined in claim 14 in which there are approximately 1,600 raster lines uniformily spaced on 0.0025 inch centers on the curved surface being marked.

16. The layout machine defined in claim 1 in which the object being marked has a cylindrical curved surface of progressively decreasing radius; in which the laser beam follows a path defined by a plurality of concentric rings on the curved surface of the object being marked.

17. The layout machine defined in claim 16 in which the positioning means repositions the optic means after each revolution of the turntable means in forming a raster consisting of the plurality of concentric rings.

* * * * *